June 6, 1950        W. H. CAHILL        2,510,798

SINGLE-WHEEL STEERING MECHANISM

Filed Dec. 29, 1947

INVENTOR.
WILLIAM H. CAHILL
BY Joseph B. Gardner
his atty.

Patented June 6, 1950

2,510,798

UNITED STATES PATENT OFFICE 2,510,798

SINGLE-WHEEL STEERING MECHANISM

William Howard Cahill, Oakland, Calif., assignor to Antone Gus Tassano, Stockton, Calif.

Application December 29, 1947, Serial No. 794,355

2 Claims. (Cl. 280—87.01)

This invention relates to wheeled transport vehicles of the type capable of being propelled by physical efforts of the occupant.

An object of the invention is to provide a vehicle of the tricycle type provided with propelling mechanism designed to be operated with a minimum of physical strain on the part of the vehicle occupant.

Another object of the invention is to provide a vehicle of the character described provided with improved steering mechanism.

A further object of the invention is to provide a vehicle of the class referred to which although lightly constructed and capable of being easily handled by the average child, is sufficiently rugged to be used by adults and to withstand considerable abuse without suffering destructive damage.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claims.

Referring to the drawing.

Figure 1:
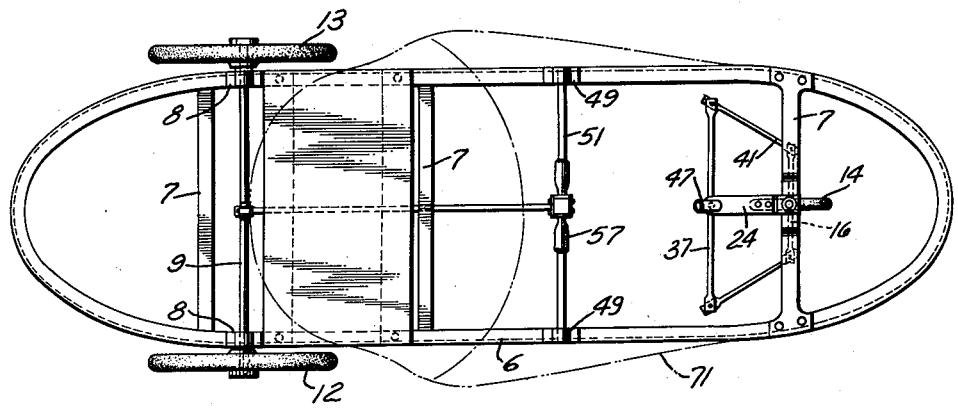
Figure 1 is a top plan view of the chassis of the vehicle of my invention.
Figure 2:
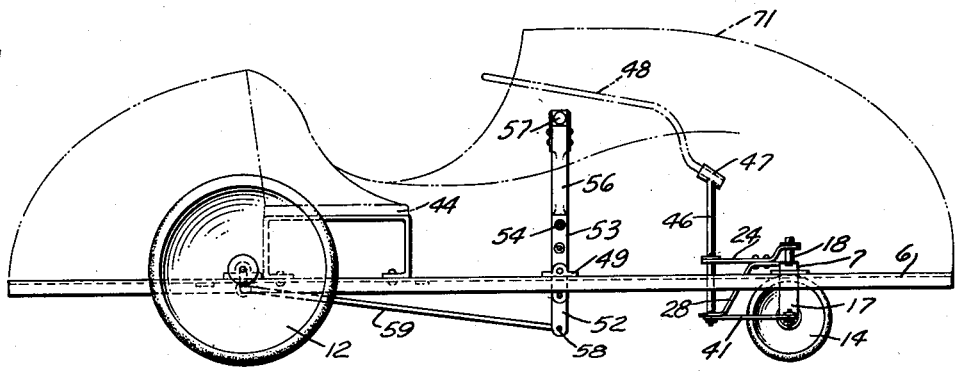
Figure 2 is a side elevational view of the structure shown in Figure 1.

In carrying out my invention, I provide a chassis frame 6 preferably comprising a unit length of angle iron or other suitable structural bar bent and welded together at its opposite ends to form a generally oval-shaped loop and fitted with laterally-extending cross-members 7 to lend desirable rigidity to the frame and to provide mounting elements for component parts of the vehicle structure to be described presently.

Journaled in bearings 8, bolted or otherwise secured to the rearward portion of the frame 6, is a drive axle 9 preferably composed of a unit section of steel shafting having its ends extending outwardly beyond the bearings 8 and the outer sides of the frame and provided in its medial portion with an integral U-shaped crank 11. Ground-engaging wheels are fitted to the extended ends of the axle 9, one wheel 12 being keyed or otherwise secured to the axle to be rotated thereby and the other wheel 13 being journaled and free to rotate on the axle. It is thus seen that the wheel 12, in response to rotative torque in the axle 9 may effect forward or rearward movement of the vehicle along the ground while the wheel 13, being free to rotate independently of the axle, may advance or lag in rotation relative to the axle when the vehicle is travelling in a curved path. This eliminates the peripheral slippage which would occur under such conditions if both wheels were secured to and to rotate in unison with the axle.

The forward portion of the chassis is fitted with a single steering wheel 14, preferably of lesser diameter than the rear wheels 12 and 13, which is disposed medially of the width of the frame and which is journaled on an axle having extended end portions 16 and carried by a vertically disposed steering fork 17. The upper portion of the steering fork carries an axially vertical stud 18 passing through an aperture 19 provided in the forward cross member 7 and also passing through an axially aligned aperture formed in an arm 21 spaced above the cross member. A washer 22 and cotter pin 23, fitted to the stud 18 above the arm 21, are preferably provided for securing the stud against axial displacement downwardly relative to the arm 21 and cross member 7. The arm 21 forms the forward extension of a bracket bar 24 having its downwardly depressed medial portion overlying and secured by rivets 26 or other suitable means to an arm 27 formed integrally with or welded to the cross member 7 and extending rearwardly from the central portion of the latter. The arm 27 is continued rearwardly in a downwardly directed portion 28 having at its lower end a horizontally disposed ear 29 having therein an aperture 31 providing a journal for the lower end of an axially vertical shaft 32. The shaft 32 also passes through and is journaled in the apertured rearward extension 33 of the bracket bar 24 which overlies the ear 29 and is fitted above the bracket extension 33 with a washer 34 and cotter pin 36, or their equivalent, for preventing downward axial displacement of the shaft. Secured to the lower extremity of the shaft 32 below the ear 29 and extending in opposite directions radially of the former are axially horizontal foot bars 37 each having at its outer end a clevis 38 or its equivalent in which is secured for pivotal movement, by the pin 39, a connecting rod 41 extending forwardly of the vehicle and similarly secured for pivotal movement, by a pin 42 to a clevis 43 or the like formed at the outer end of each axle end portion 16. It will be seen that the occupant of the vehicle, who may be seated on the seat 44, may extend his legs so that his feet rest on the respective foot bars 37 and by pushing on alternate bars may cause the fork 17 to rock about its vertical pivotal axis thereby swinging the steering wheel 14 to the right or left as desired and causing directed movement of the vehicle in the selected direction.

As an independent means of steering the vehicle, for the accommodation of persons who may be short-legged, handicapped in the use of their legs or minus one or both legs, I provide an upward extension 46 of the shaft 32 to which is fitted a tubular socket 47 or the like for receiving the tapered end of a tiller bar 48 extending rearwardly of the vehicle to a position where it may be readily grasped by the occupant of the seat 44. By swinging the tiller bar to the right or left, a corresponding steering of the vehicle may be obtained.

I provide means whereby the vehicle may be powered by the physical efforts of the occupant so that the former may be made to travel forwardly or rearwardly at the selection of the occupant and at a rate proportionate to the degree of physical effort expended. Situated forwardly of the seat 44 and journaled at its ends in bearings 49 secured to the frame 6, is a rocker shaft 51 disposed axially transversely of the frame and having secured at its center a rocker bar comprising a lever section 52 extending radially downwardly from the rocker shaft and a lever tongue 53 integral with the rocker lever and rising radially upwardly from the rocker shaft. The tongue 53 is provided with suitable bolts 54 or equivalent means for securing thereto an upwardly extending operating lever 56 to the upper end of which is attached a twin-handled grip 57 disposed within reach of the vehicle occupant and arranged to be grasped by each of his hands. The lower end of the lever 52 is provided with an aperture 58 journaling the end of a connecting rod 59 which extends rearwardly of the vehicle and which is provided at its rear end with a split collar 61 encircling and journaled on the crank pin portion of the rear axle crank 11. It will be seen that as the operating lever 56 is rocked alternately forwardly and rearwardly, the axially oscillating connecting rod 59 will impart, through the crank 11, rotative effort to the axle 9 with the result that the vehicle will be caused to move along the ground. The direction of movement, of course, may be selected by the vehicle occupant and depends upon which direction he chooses to start rotation of the crank 11.

Figures 3, 4:
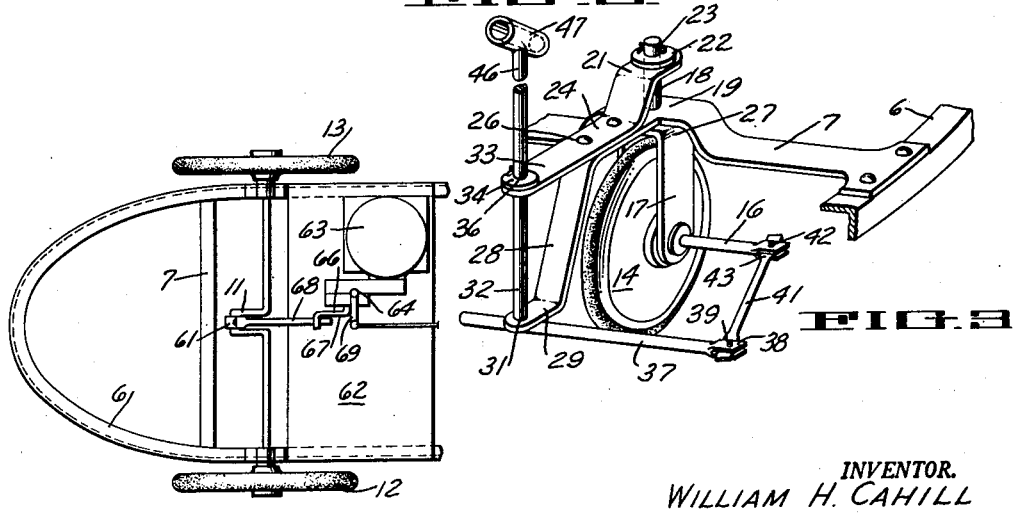
Figure 3 is an enlarged scale perspective view of the front portion of the vehicle showing the steering mechanism.
Figure 4 is a top plan view of the rear portion of the chassis showing the application of power drive mechanism to the vehicle.

In Figure 4 I have shown a modified form of vehicle drive. Here the frame is provided with a platform 62 or the like positioned just forwardly of the rear axle 9 and carrying a small single cylinder internal combustion engine 63 having a gear reduction and clutch mechanism 64 associated therewith, the power output shaft 66 of which is fitted with a crank 67 connected by means of a suitable connecting rod 68 with the rear axle crank 11. Thus as the shaft 66 is rotated at slow but adequate speed by the engine 63, the axle will be correspondingly rotated so as to move the vehicle. By means of a manually actuated clutch control 69, the power of the engine 63 may be connected with or disconnected from the axle as desired by the vehicle occupant and by accelerating or decelerating the engine, variations in vehicle speed may be obtained.

Although the vehicle body forms no part of the structure of my invention, I have indicated the former by the dot-dash line 71 to show its relationship with the other parts of the vehicle structure.

I claim:

1. In a vehicle steering assembly, the combination which comprises a horizontally disposed chassis carried by wheels at the rear and having a transversely disposed strut therein spaced from the forward end, a king pin having a wheel receiving yoke on the lower end pivotally mounted in said strut and positioned on the longitudinal center of said chassis, an arm extended rearwardly from said strut and also positioned on the longitudinal center of said chassis, said strut having a rearwardly and downwardly extended brace with the lower end extended horizontally and positioned below the end of the arm, a steering post having a handle on the upper end journaled in the extended ends of the arm and brace, a transversely disposed tie rod carried by the lower end of said post, an axle extended through the lower ends of the arms of the yoke of the king pin, a wheel in the yoke journaled on the axle, and bars connecting the ends of the axle to corresponding ends of the tie rod.

2. In a vehicle steering assembly, the combination which comprises a horizontally disposed chassis carried by wheels at the rear and having a transversely disposed strut therein spaced from the forward end, a king pin having a wheel receiving yoke on the lower end pivotally mounted in said strut and positioned on the longitudinal center of said chassis, said strut having an upwardly extended centrally disposed section to receive the upper end of the yoke of the king pin, an arm having an upwardly extended forward end extended rearwardly from said strut and also positioned on the longitudinal center of said chassis, said strut having a rearwardly and downwardly extended brace with the lower end extended horizontally and positioned below the end of the arm, a steering post having a handle on the upper end journaled in the extended end of the arm and brace, a transversely disposed tie rod carried by the lower end of said post, an axle extended through the lower ends of the arms of the yoke of the king pin, a wheel in the yoke journaled on the axle, and bars connecting the ends of the axle to corresponding ends of the tie rod.

WILLIAM HOWARD CAHILL.

REFERENCES CITED

The following references are of record in the file of this patent:

UNITED STATES PATENTS

| Number | Name | Date |
|---|---|---|
| 3,207 | Crandall | Nov. 24, 1868 |
| 373,980 | Horn | Nov. 29, 1887 |
| 380,770 | Schiermeyer | Apr. 10, 1888 |
| 870,472 | Schroeder | Nov. 5, 1907 |
| 870,834 | Lindley | Nov. 12, 1907 |
| 1,363,214 | Alexander | Dec. 28, 1920 |